106. COMPOSITIONS, COATING OR PLASTIC
78 Patented June 3, 1930

1,761,343

UNITED STATES PATENT OFFICE

ALBERT C. HOLZAPFEL, OF NEW YORK, N. Y.

PROCESS OF PROTECTING THE INTERIORS OF OIL-CRACKING RETORTS

No Drawing. Application filed March 30, 1927. Serial No. 179,724.

This invention relates to a process of protecting the interiors of oil cracking retorts, cylinders and the like.

Oil cracking processes by which gasoline and other light petroleum hydrocarbons are obtained from heavier petroleum oils are very destructive to the retorts, stills, cylinders or the like in which the cracking operation is carried out, the metal rapidly becoming corroded or eaten away whereby the life of the retort or the like is lessened and the purity of the cracked products diminished.

Many attempts heretofore have been made to protect the interiors of cracking retorts to prevent such acid and other corrosion but without any substantial degree of success owing, it is believed, to the nature of the materials treated therein and the high temperatures employed.

The high temperatures used in cracking processes are destructive of practically all known paint materials which would in any case, be dissolved and removed by the gasoline and other light petroleum vapors in the cracking retorts. The use of steam in connection with "cracking" would moreover remove any so-called "water paints", which might stand the temperatures of 900 degrees Fahr. and upwards, under which cracking processes are carried out.

Now I have discovered that cracking retorts and the like can to a very substantial and practically advantageous extent be protected by applying to the interior thereof a coating comprising a mixture of ordinary commercial water glass, water and powdered solid alkaline earth oxygen containing compound or compounds as for example alkaline earth carbonate or oxids and preferably magnesite and slaked lime, and one or more powdered inert refractory mineral substances preferably fire clay, to which may advantageously be added a pigment which is inert under the conditions which obtain in oil cracking retorts, preferably powdered titanium oxid which is both heat and acid proof and substantially insoluble in the light and heavy petroleum products with which it comes into contact in the cracking retort.

I prefer to employ a composition containing the following materials and to employ them in the proportions indicated:

| | Parts by weight |
|---|---|
| Commercial water glass | 45 |
| Water | 28 |
| Magnesite $MgCO_3$ | 5 |
| Slaked lime $CaO$ | 2 |
| Fire clay $Si_2 \cdot Al_2O_3 \cdot 1\frac{1}{2}H_2O$ | 10 |

If a pigment is used I prefer to use powdered titanium oxid and to employ it in the proportion of 10 parts by weight to 90 parts by weight of the preferred mixture set forth.

Magnesite may be employed without the slaked lime and the lime may be employed without the magnesite with some measure of success but I prefer to employ both magnesite and lime.

The fire clay may be omitted or other refractory inert mineral powder substituted therefor and fairly satisfactory results obtained but I have obtained the best results by employing the fire clay in association with the other preferred ingredients.

The proportions of the ingredients may be widely varied. I may with some measure of success employ the water glass and water in proportions of from 25 to 75 per cent. by weight of the former to 75 to 25 per cent. by weight of the later and may employ the other ingredients in widely varying proportions. However, by employing all of the ingredients mentioned and in substantially the proportions indicated, I have obtained the most satisfactory results.

The preferred composition hereinbefore set forth is in the form of a paint adapted to be applied to the interior of cracking retorts in any of the ways in which paint is applied to surfaces to be coated therewith.

The composition should be applied promptly and preferably immediately, after being prepared as the constituents tend to thicken and finally to harden.

In using my composition in cracking retorts not before treated therewith I prefer to successively apply two or three coats, applying the second coat as soon as the first has dried or set, the same being done in the case of the third coat if a third coat is applied. In using it thereafter I prefer to apply one coat every two or three weeks. Cracking retorts ordinarily are opened up every two or three weeks and the later repair coats can advantageously be applied at such times. Before the renewal or repair coats are applied the surface to be renewed or repaired should be thoroughly cleaned as by brushing it vigorously with a steel wire broom to remove all foreign matter which has been deposited on the steel surface of the interior of the retort.

In some cases I have obtained particularly satisfactory results by first applying three successive coats of my composition to the interior surfaces of retorts not previously treated according to my process and then applying to the surface of the outer coat a temporary water-proofing coating preferably a thin coating of a heavy mineral oil. This oil coating serves to protect the coating beneath it for the short time it is subjected to the contact of the materials employed in cracking operations before the coating has been raised to the high temperature (around 900 to 1,000° F.) employed in cracking oils and which temperature is necessary to make the steel protecting qualities of my composition thoroughly effective. In its green or unheated condition my composition is materially less resistant to attack by the materials coming into contact therewith than in its finished or indurated condition.

Ordinarily however, it is not necessary to apply the temporary water-proofing oil coating, particularly if my preferred composition is used, as such composition offers considerable resistance to the water, steam or other materials coming into contact therewith even before it is transformed into its final condition by the heat to which it is subjected durng the oil cracking operation.

My composition is adhesive to the steel surfaces of the cracking retorts, is substantially insoluble in light and heavy petroleum hydrocarbons and their vapors and in water and steam even in the presence of acid and not only withstands temperatures around 900° and 1,000° F. but is indurated and improved by being heated to such temperatures.

While I have described in detail the preferred practice of my process and my preferred composition employed therein it is to be understood that my invention is not limited thereto except as set forth in the subjoined claims.

Having described my invention, I claim:

1. A process of protecting the interior surface of oil cracking retorts and the like which consists in applying thereto a composition comprising water glass, water, powdered magnesite, slaked lime, fire clay and titanium oxid, and subjecting the coating to an oil cracking temperature.

2. A process of protecting the interior surface of oil cracking retorts and the like which consists in applying thereto a composition comprising water glass, water, powdered magnesite, slaked lime and fire clay, allowing the same to set, applying thereto a water-proofing coating comprising a heavy mineral oil and subjecting the coatings to an oil cracking temperature.

3. A process of protecting the interior surface of oil cracking retorts and the like which consists in applying thereto a composition comprising water glass, water, powdered magnesite, slaked lime and fire clay, allowing the coating to dry, applying thereto a coating of water-proofing material comprising a heavy mineral oil and subjecting the coatings to an oil cracking temperature in the presence of oil to be cracked.

4. The process of protecting the interior surface of oil cracking retorts and the like which comprises applying thereto a composition comprising water glass, water, and a powdered solid oxygen-containing alkaline earth compound, allowing said composition to set, applying thereto a coating of heavy mineral oil, and subjecting the coatings to an oil cracking temperature.

5. A process of protecting the interior surface of oil cracking retorts and the like which comprises applying thereto a composition comprising water glass, water, powdered magnesite, slaked lime and fire clay, coating said composition with a film of a heavy mineral oil, and subjecting the coated composition to heat to indurate said composition.

6. A process of protecting the interior surface of oil cracking retorts and the like which comprises applying thereto a coating of a composition comprising water glass, water, powdered magnesite, slaked lime and a powdered refractory material, which composition may be indurated by subjecting it to an oil cracking temperature, and thereafter subjecting said coating to an oil cracking temperature.

In testimony whereof I affix my signature.

ALBERT C. HOLZAPFEL.